(12) United States Patent
Wang et al.

(10) Patent No.: US 11,700,849 B2
(45) Date of Patent: Jul. 18, 2023

(54) METHOD FOR PREPARATION OF ATTAPULGITE-BASED PH-RESPONSIVE ANTIBACTERIAL MATERIAL

(71) Applicant: Lanzhou Institute of Chemical Physics, Chinese Academy of Sciences, Gansu (CN)

(72) Inventors: Aiqin Wang, Gansu (CN); Aiping Hui, Gansu (CN); Fangfang Yang, Gansu (CN); Yuru Kang, Gansu (CN); Bin Mu, Gansu (CN); Qin Wang, Gansu (CN); Yongfeng Zhu, Gansu (CN)

(73) Assignee: Lanzhou Institute of Chemical Physics, Chinese Academy of Sciences, Gansu (CN)

( * ) Notice: Subject to any disclaimer, the term of this patent is extended or adjusted under 35 U.S.C. 154(b) by 0 days.

(21) Appl. No.: 17/781,667

(22) PCT Filed: Feb. 9, 2021

(86) PCT No.: PCT/CN2021/076254
§ 371 (c)(1),
(2) Date: Jun. 1, 2022

(87) PCT Pub. No.: WO2021/203833
PCT Pub. Date: Oct. 14, 2021

(65) Prior Publication Data
US 2023/0000076 A1    Jan. 5, 2023

(30) Foreign Application Priority Data

Apr. 10, 2020    (CN) .......................... 202010280575.9

(51) Int. Cl.
| | | |
|---|---|---|
| *A01N 25/12* | (2006.01) | |
| *A23K 20/28* | (2016.01) | |
| *A23K 20/163* | (2016.01) | |
| *A23K 40/10* | (2016.01) | |
| *A23K 40/30* | (2016.01) | |
| *A23K 20/105* | (2016.01) | |
| *A23K 20/111* | (2016.01) | |
| *A23K 20/121* | (2016.01) | |
| *A01P 1/00* | (2006.01) | |
| *A01N 35/02* | (2006.01) | |
| *A01N 43/08* | (2006.01) | |

(52) U.S. Cl.
CPC ............. *A01N 25/12* (2013.01); *A01N 35/02* (2013.01); *A01N 43/08* (2013.01); *A01P 1/00* (2021.08); *A23K 20/105* (2016.05); *A23K 20/111* (2016.05); *A23K 20/121* (2016.05); *A23K 20/163* (2016.05); *A23K 20/28* (2016.05); *A23K 40/10* (2016.05); *A23K 40/30* (2016.05)

(58) Field of Classification Search
CPC ........... A01P 1/00; A01N 25/12; A01N 35/02; A01N 43/08
USPC ....................................................... 514/461
See application file for complete search history.

(56) References Cited

U.S. PATENT DOCUMENTS 4,171,386 A    10/1979    Skoch et al.

FOREIGN PATENT DOCUMENTS

| CN | 102464729 A | | 5/2012 |
|---|---|---|---|
| CN | 104719671 A | | 6/2015 |
| CN | 105795134 A | | 7/2016 |
| CN | 107913287 A | * | 4/2018 |
| CN | 107913287 A | | 4/2018 |
| CN | 109498645 A | | 3/2019 |
| CN | 111011612 A | | 4/2020 |
| CN | 111034861 A | | 4/2020 |
| CN | 111195285 A | | 5/2020 |
| CN | 111328918 A | | 6/2020 |

OTHER PUBLICATIONS

The State Intellectual Property Office of People's Republic of China; English Translation of First Office Action for CN 202010280575.9; dated Dec. 14, 2021.
ISA/CN; International Search Report prepared for PCT/CN2021/076254; dated May 13, 2021.

* cited by examiner

*Primary Examiner* — Johann R Richter
*Assistant Examiner* — Courtney A Brown
(74) *Attorney, Agent, or Firm* — Kirk A. Wilson; Joseph T. Guy; Patent Filing Specialist Inc.

(57) ABSTRACT

Disclosed is a method for preparing an attapulgite-based pH-responsive antibacterial material, including: directly spraying a natural aldehyde-based antibacterial agent onto an attapulgite powder under stirring, and constantly stirring the attapulgite powder for 20-30 min; grinding the attapulgite powder in a ball mill for 30-60 min to obtain a ground attapulgite powder; placing the ground attapulgite powder in a stirred tank, and spraying a chitosan-citric acid aqueous solution onto the ground attapulgite powder; after spraying, constantly stirring the ground attapulgite powder for 30-120 min; and finally drying the ground attapulgite powder to obtain a dried attapulgite powder, sieving the dried attapulgite powder to obtain a sieved attapulgite powder, and packaging the sieved attapulgite powder to obtain the antibacterial material.

6 Claims, 2 Drawing Sheets

METHOD FOR PREPARATION OF ATTAPULGITE-BASED PH-RESPONSIVE ANTIBACTERIAL MATERIAL

CROSS REFERENCE TO RELATED APPLICATION

This patent application claims the benefit and priority of Chinese Patent Application No. 202010280575.9, entitled "Method for preparation of attapulgite-based pH-responsive antibacterial material" filed on Apr. 10, 2020, the disclosure of which is incorporated by reference herein in its entirety as part of the present application.

TECHNICAL FIELD

The present disclosure relates to a method for preparing an attapulgite-based pH-responsive antibacterial material, which is mainly used to replace antibiotics in the process of livestock and poultry breeding, and belongs to the technical field of nano-mineral functional materials and animal feed additives.

BACKGROUND ART

On Jul. 9, 2019, the Ministry of Agriculture and Rural Affairs of the People's Republic of China issued Announcement No. 194, which announced the withdrawal plan and related management policies of medicated feed additives, and clearly proposed a "comprehensive ban on antibiotics" on Jul. 1, 2020. Therefore, it urgently needs to develop the safe and efficient feed antibiotic substitutes for healthy animal breeding.

Among of many antibiotic substitutes, natural antibacterial agents such as plant extracts exhibit the unlimited potential for the substitution of antibiotics, which are also one of the most common functional additive products for feed antibiotic substitute applications in the EU (Northern Animal Husbandry, 2019, 09, 17). Plant extracts are mainly intended to directly inhibit and kill pathogenic bacteria, in which aldehydes such as cinnamaldehyde are a commonly used feed additive with a good antibacterial effect after being added into the feed (Chinese Journal of Animal Nutrition, 2019, 1-8). However, aldehydes need to be stabilized due to the disadvantages of easy oxidation, strong volatility, and a certain pungent odor.

Attapulgite is a natural hydrated magnesium aluminum silicate clay mineral with one-dimensional nanorod-like morphology and zeolite-like pores of 0.37×0.64 nm. It has been reported that organic molecules could be resided in the pores of attapulgite under the mechanochemical action. However, the aldehydes residing in the attapulgite pores still present a pungent odor. In order to further solve the shortcomings of natural aldehyde-based antibacterial agents, the present disclosure is to prepare a pH-responsive antibacterial material by adopting the principle of forming Schiff bases between amino groups of chitosan and aldehydes on the basis of aldehydes residing in the attapulgite pores.

SUMMARY

The object of the present disclosure is to provide a method for preparing an attapulgite-based pH-responsive antibacterial material. On the one hand, the method makes it possible to solve the disadvantages of natural aldehyde-based antibacterial agents of easy oxidation, strong volatility and pungent odor. On the other hand, the method makes it possible to solve the sustained release of natural aldehyde-based antibacterial agents in animal guts with pH-responsiveness of chitosan, which could be directly used as animal feed for safe animal breeding.

Preparation of an Attapulgite-Based pH-Responsive Antibacterial Material

The present disclosure provides a method for preparing an attapulgite-based pH-responsive antibacterial material, including:

directly spraying a natural aldehyde-based antibacterial agent onto an attapulgite powder under stirring, and constantly stirring the attapulgite powder for 20-30 min;

grinding the attapulgite powder in a ball mill for 30-60 min to obtain a ground attapulgite powder;

placing the ground attapulgite powder in a stirred tank, and spraying a chitosan-citric acid aqueous solution onto the ground attapulgite powder;

after spraying, constantly stirring the ground attapulgite powder for 30-120 min; and finally, drying the ground attapulgite powder to obtain a dried attapulgite powder, sieving the dried attapulgite powder to obtain a sieved attapulgite powder, and packaging the sieved attapulgite powder to obtain the antibacterial material.

In some embodiments, the attapulgite is smashed, acidified and degritted to have a purity of not less than 90% and a particle size of not lower than 200 mesh.

In some embodiments, the natural aldehyde-based antibacterial agent is at least one selected from the groups consisting of citral, lauryl aldehyde, cinncloval, cinnamaldehyde, benzaldehyde, perillaldehyde, vanillin, furfural, 2,4-octadienal, 2,4-nonadienal, 2,4-heptadienal, and 2,4-decadienal, and the natural aldehyde-based antibacterial agent is used in an amount of 10-50% of the mass of the attapulgite.

In some embodiments, the ball mill has a grinding ball-to-powder mass ratio of 1:10 in grinding state.

In some embodiments, the chitosan-citric acid aqueous solution has a mass concentration of chitosan of 5-10%, and a mass concentration of citric acid of 1-5%; the chitosan-citric acid aqueous solution is used in an amount of 7.5-20% of the mass of the attapulgite.

Structural Characterization of the Antibacterial Material

Taking a cinnamaldehyde-chitosan Schiff base prepared in Example 2 as an example, the structure of the antibacterial material prepared in the present disclosure is characterized. FIG. 1 is a diagram of thermogravimetric analysis curves of the attapulgite and as-prepared antibacterial material in Example 2 of the present disclosure. Compared with attapulgite, it can be seen that the antibacterial material has an organic loading ratio of 22.9%, showing that the attapulgite as a support material can effectively realize the reaction of aldehydes with chitosan to prepare a Schiff base antibacterial material.

FIG. 2 is a diagram of the Fourier Transform Infrared spectra of the attpaulgite and antibacterial material obtained in Example 2 of the present disclosure. It can be seen that there is an absorption peak at 1456 $cm^{-1}$ attributing to C—H and an absorption peak at 874 $cm^{-1}$ attributing to C—H of a benzene ring, indicating that there is a benzene ring structure in aldehyde-chitosan Schiff base structure; there are absorption peaks at 1632 and 1656 cm' attributing to —C=N, indicating that the aldehyde is bound to the chitosan through carbon-nitrogen double bonds. Therefore, it can be concluded that a Schiff base antibacterial material has been prepared successfully.

3. Evaluation of Antibacterial Activity of the Antibacterial Material

The antibacterial activity is evaluated using a minimal inhibitory concentration (MIC) assay. Herein, an experimental group, a negative control group, a positive control group, and a blank control group are set up.

(1) Preparation of standard strains: Standard *Escherichia coli* (*E. coli*, ATCC 25922) strains and *Staphylococcus aureus* (*S. aureus*, ATCC 25923) strains were selected. *E. coli* and *S. aureus* stored at −20° C. were thawed and inoculated into Luria-Bertani (LB) broth, and incubated in a 35° C. incubator for 12 h at a speed of 160 r/min. After resurrecting the strains, the strains were transferred to nutrient agar media again, and incubated in a constant temperature incubator at 37° C. After 3 h, the bacteria were subcultured to enter the logarithmic phase. A single colony of the standard strain entering the logarithmic phase was selected to prepare a bacterial suspension, the turbidity of the bacterial suspension was adjusted to 0.5 McFarland standard turbidity, and the bacterial suspension was diluted with PBS in a ratio of 1:10 to achieve a bacterial count of $10^7$ CFU/mL, $10^6$ CFU/mL, $10^5$ CFU/mL, and $10^4$ CFU/mL, respectively.

(2) Preparation of agar plates with different concentrations of unknown samples: The samples treated at different pH values were evenly dispersed into the nutrient agar media, *E. coli* groups were divided into 2.5 mg/mL, 1.5 mg/mL, 1 mg/mL, and 0.5 mg/mL groups; *S. aureus* groups were divided into 2.5 mg/mL, 1.5 mg/mL, 1 mg/mL, and 0.5 mg/mL groups.

(3) Plating: 1 μL each of the above-mentioned bacterial suspensions (with a bacterial content of about $1 \times 10^4$ CFU/mL) was pipetted and plated in agar plates containing unknown samples; the samples were plated in three different positions in each plate, and the test was repeated twice. All the plates were transferred to a constant temperature incubator for culture, and the growth of the bacteria was observed after culturing at 37° C. for 24 h.

Table 1 shows the results of the MIC assay of the samples obtained in Examples 1 to 6 treated at different pH values against *E. coli* and *S. aureus*. The results showed that the samples obtained in Examples 1 to 6 of the present disclosure have MICs of 0.5 mg/mL and 1 mg/mL against *E. coli* and *S. aureus*, respectively, and exhibit strong antibacterial activity against both Gram-negative and Gram-positive bacteria. Compared with the MICs of samples treated at different pH values, it can be seen that the samples prepared by the present disclosure show weak antibacterial activity under acidic conditions and strong antibacterial activity under neutral conditions, respectively.

To sum up, in the present disclosure the mechanochemical method is used to reside aldehydes in the attapulgite pores, and then a chitosan solution is sprayed onto an attapulgite powder, so that the aldehydes react with chitosan to form Schiff bases. The present disclosure makes it possible to overcome the shortcomings of easy volatility and strong pungent odor of natural aldehyde-based antibacterial agents, improve the palatability of animals when they are used in safe animal breeding, thereby increasing the utilization efficiency of natural aldehyde-based antibacterial agents. The present disclosure makes it possible to improve the utilization efficiency of natural aldehyde-based antibacterial agents. In the present disclosure, chitosan is used to confer pH responsiveness on antibacterial materials: amino groups of the chitosan are protonated and antibacterial substances are not released under acidic conditions, while the hydrolysis of Schiff base leads to continuous release of antibacterial substances under neutral and weakly alkaline conditions. Therefore, the antibacterial agent could be directly used as animal feed for safe animal breeding.

DETAILED DESCRIPTION OF THE EMBODIMENTS

Figure 1:
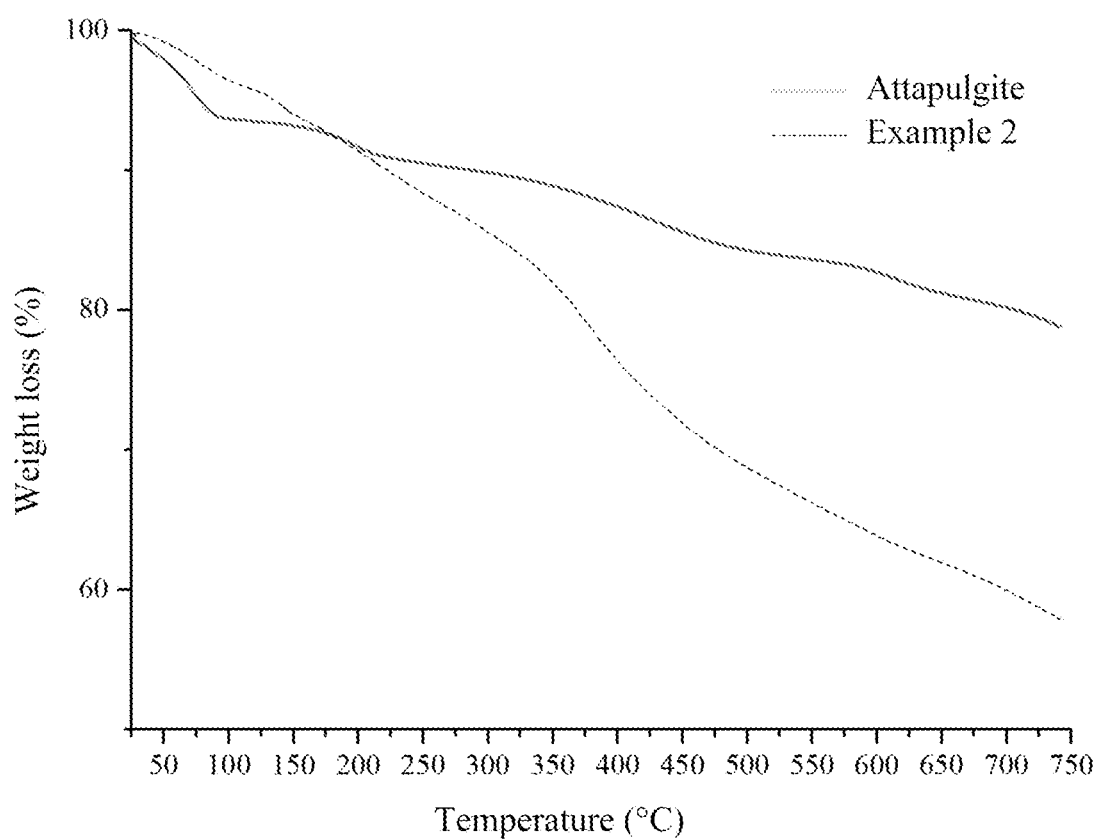
FIG. 1 is a diagram of thermogravimetric analysis curves of the attapulgite and antibacterial material obtained in Example 2 of the present disclosure.
Figure 2:
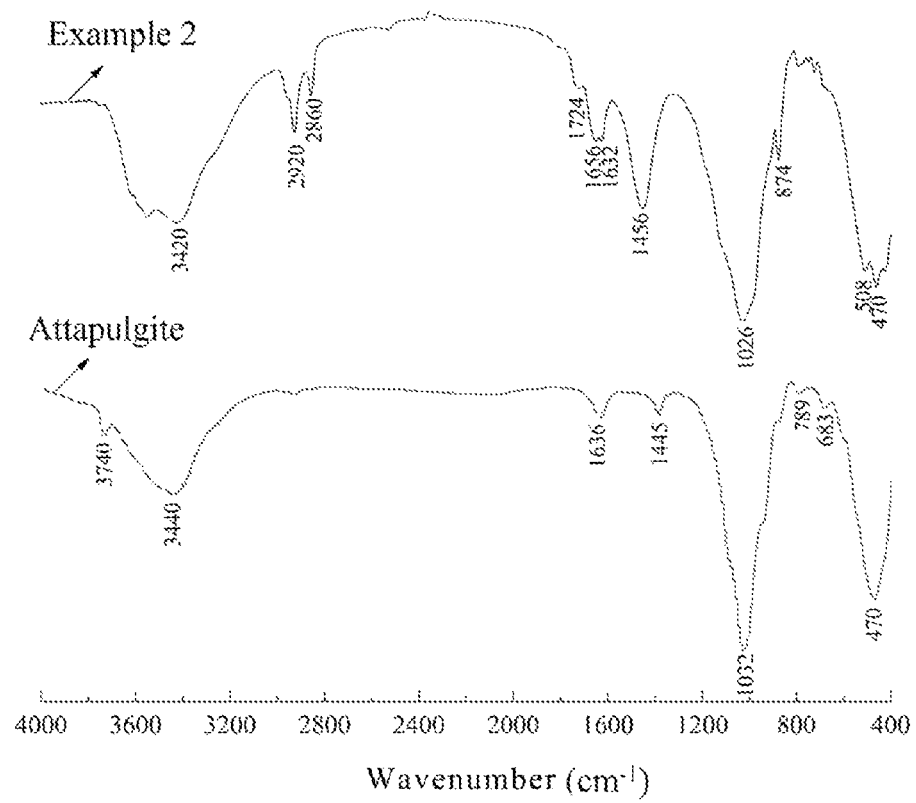
FIG. 2 is a diagram of Fourier Transform Infrared spectra of the antibacterial material obtained in Example 2 of the present disclosure.

The method for preparing an attapulgite-based pH-responsive antibacterial material according to the present disclosure and antibacterial activity of the attapulgite-based pH-responsive antibacterial material will be described in detail below with reference to specific examples.

Example 1

Under stirring, 30% (w/w) citral to the mass of attapulgite was sprayed onto an attapulgite powder, constantly stirred for 30 min, and ground in a ball mill for 30 min (in a grinding ball-to-powder mass ratio of 1:10). The obtained ground attapulgite powder was placed in a stirred tank, and a chitosan-citric acid aqueous solution (in the system, the chitosan-citric acid aqueous solution had a concentration of chitosan of 5% and a concentration of citric acid of 2.5%) was sprayed onto the ground attapulgite powder, in which the chitosan-citric acid aqueous solution was present in an amount of 7.5% of the mass of the attapulgite. After spraying, the ground attapulgite powder was stirred for 30 min, and finally was dried, sieved, and packaged to obtain the antibacterial material. The antibacterial activity of the antibacterial material is shown in Table 1.

Example 2

Under stirring, 25% (w/w) cinnamaldehyde to the mass of attapulgite was sprayed onto an attapulgite powder, constantly stirred for 30 min, and ground in a ball mill for 40 min (in a grinding ball-to-powder mass ratio of 1:10). The obtained ground attapulgite powder was placed in a stirred tank, and a chitosan-citric acid aqueous solution (in the system, the chitosan-citric acid aqueous solution had a concentration of chitosan of 7.5% and a concentration of citric acid of 1%) was sprayed onto the ground attapulgite powder, in which the chitosan-citric acid aqueous solution was present in an amount of 10% of the mass of the attapulgite. After spraying, the ground attapulgite powder was stirred for 45 min, and finally was dried, sieved, and packaged to obtain the antibacterial material. The antibacterial activity of the antibacterial material is shown in Table 1.

Example 3

Under stirring, 40% (w/w) lauryl aldehyde to the mass of attapulgite was sprayed onto an attapulgite powder, constantly stirred for 30 min, and ground in a ball mill for 50 min (in a grinding ball-to-powder mass ratio of 1:10). The obtained ground attapulgite powder was placed in a stirred tank, and a chitosan-citric acid aqueous solution (in the system, the chitosan-citric acid aqueous solution had a concentration of chitosan of 10%, and the chitosan-citric acid aqueous solution has a concentration of citric acid of 2.5%) was sprayed onto the ground attapulgite powder, in which the chitosan-citric acid aqueous solution was present in an amount of 15% of the mass of the attapulgite. After spraying, the ground attapulgite powder was stirred for 60 min, and finally was dried, sieved, and packaged to obtain the antibacterial material. The antibacterial activity of the antibacterial material is shown in Table 1.

Example 4

Under stirring, 10% (w/w) furfural to the mass of attapulgite was sprayed onto an attapulgite powder, constantly stirred for 30 min, and ground in a ball mill for 30 min (in a grinding ball-to-powder mass ratio of 1:10). The obtained ground attapulgite powder was placed in a stirred tank, and a chitosan-citric acid aqueous solution (in the system, the chitosan-citric acid aqueous solution had a concentration of chitosan of 7.5%, and the chitosan-citric acid aqueous solution has a concentration of citric acid of 5%) was sprayed onto the ground attapulgite powder, in which the chitosan-citric acid aqueous solution was present in an amount of 7.5% of the mass of the attapulgite. After spraying, the ground attapulgite powder was stirred for 80 min, and finally was dried, sieved, and packaged to obtain the antibacterial material. The antibacterial activity of the antibacterial material is shown in Table 1.

Example 5

Under stirring, 50% (w/w) 2,4-heptadienal to the mass of attapulgite was sprayed onto an attapulgite powder, constantly stirred for 30 min, and ground in a ball mill for 60 min (in a grinding ball-to-powder mass ratio of 1:10). The obtained ground attapulgite powder was placed in a stirred tank, and a chitosan-citric acid aqueous solution (in the system, the chitosan-citric acid aqueous solution had a concentration of chitosan of 10%, and the chitosan-citric acid aqueous solution has a concentration of citric acid of 5%) was sprayed onto the ground attapulgite powder, in which the chitosan-citric acid aqueous solution was present in an amount of 20% of the mass of the attapulgite. After spraying, the ground attapulgite powder was stirred for 120 min, and finally was dried, sieved, and packaged to obtain the antibacterial material. The antibacterial activity of the antibacterial material is shown in Table 1.

Example 6

Under stirring, 25% (w/w) cinnamaldehyde to the mass of attapulgite was sprayed onto an attapulgite powder, constantly stirred for 30 min, and ground in a ball mill for 30 min (in a grinding ball-to-powder mass ratio of 1:10). The obtained ground attapulgite powder was placed in a stirred tank, and a chitosan-citric acid aqueous solution (in the system, the chitosan-citric acid aqueous solution had a concentration of chitosan of 7.5%, and the chitosan-citric acid aqueous solution has a concentration of citric acid of 5%) was sprayed onto the ground attapulgite powder, in which the chitosan-citric acid aqueous solution was present in an amount of 17.5% of the mass of the attapulgite. After spraying, the ground attapulgite powder was stirred for 60 min, and finally was dried, sieved, and packaged to obtain the antibacterial material. The antibacterial activity of the antibacterial material is shown in Table 1.

In the above examples, the attapulgite was acidified by sulfuric acid in an amount of 2-3% by mass of the attapulgite, and degritted to have a purity of not less than 90%, which was smashed to sieve through a 200 mesh sieve before use.

TABLE 1

MICs of antibacterial materials prepared in Examples 1 to 6 at different pH values

| Sample | System pH | MIC (mg/mL) S. aureus | E. coli |
|---|---|---|---|
| Example 1 | 2 | 1 | 2.5 |
|  | 4 | 1 | 2.5 |
|  | 6 | 0.5 | 1.5 |
|  | 8 | 0.5 | 1.5 |
| Example 2 | 2 | 1 | 2.5 |
|  | 4 | 0.5 | 1.5 |
|  | 6 | 0.5 | 1 |
|  | 8 | 0.5 | 1 |
| Example 3 | 2 | 1.5 | 2.5 |
|  | 4 | 1.5 | 2.5 |
|  | 6 | 0.5 | 1 |
|  | 8 | 0.5 | 1 |
| Example 4 | 2 | 2.5 | >2.5 |
|  | 4 | 1.5 | 2.5 |
|  | 6 | 1 | 2.5 |
|  | 8 | 1 | >2.5 |
| Example 5 | 2 | 2.5 | >2.5 |
|  | 4 | 2.5 | >2.5 |
|  | 6 | 1.5 | >2.5 |
|  | 8 | 1.5 | >2.5 |
| Example 6 | 2 | 2.5 | >2.5 |
|  | 4 | 2.5 | >2.5 |
|  | 6 | 1.5 | >2.5 |
|  | 8 | 1.5 | >2.5 |

What is claimed is:

1. A method for prepay attapulgite-based pH-responsive antibacterial material, comprising:
   directly spraying a natural aldehyde-based antibacterial agent onto an attapulgite powder wider stirring, and constantly stirring the attapulgite powder for 20-30 min;
   grinding the attapulgite powder in a ball mill for 30-60 min to obtain a ground attapulgite powder;
   placing the ground attapulgite powder in a stirred tank, and spraying a chitosan-citric acid aqueous solution onto the ground attapulgite powder;
   after spraying, constantly stirring the ground attapulgite powder for 30-120 ruin; and
   finally, drying the ground attapulgite powder to obtain a dried attapulgite powder, sieving the dried attapulgite powder to obtain a sieved attapulgite powder, and packaging the sieved attapulgite powder to obtain the antibacterial material.

2. The method for preparing an attapulgite-based pH-responsive antibacterial material of claim further comprising before directly spraying the natural aldehyde-based antibacterial agent onto the attapulgite powder under stirring, subjecting an attapulgite to smashing, acidifying and degritting to obtain the attapulgite powder, the attapulgite powder having a purity of not less than 90% and a particle size of not lower than 200 mesh.

3. The method for preparing ran attapulgite-based pH-responsive antibacterial material of claim 1, wherein the natural aldehyde-based antibacterial agent is at least one selected from the groups consisting of citral, lauryl aldehyde, cinncloval, cinnamaldehyde, benzaldehyde, perillaldehyde, vinillin, furfural, 2,4-octadienal, 2,4-nonadienal, 2,4-heptadienal, and 2,4-decadienal; and the natural aldehyde-based antibacterial agent is used in an amount of 10-50% of the mass of the attapulgite.

4. The method for preparing an attapulgite-based pH-responsive antibacterial material of claim 1, wherein the ball mill has a grinding ball-to-powder mass ratio of 1:10 n grinding state.

5. The method for preparing an attapulgite-based pH-responsive antibacterial material of claim 1, wherein the chitosan-citric acid aqueous solution has a mass concentration of chitosan of 5-10% and a mass concentration of citric acid of 1-5%.

6. The method for preparing an attapulgite-based pH-responsive antibacterial material of claim 1, wherein the chitosan-citric acid aqueous solution is present in an amount of 7.5-20% of the mass of the attapulgite.

* * * * *